US012703249B2

(12) United States Patent
Isami et al.

(10) Patent No.: US 12,703,249 B2
(45) **Date of Patent: *Aug. 11, 2026**

(54) ELECTRIC VEHICLE

(71) Applicant: TOYOTA JIDOSHA KABUSHIKI KAISHA, Aichi-ken (JP)

(72) Inventors: Yoichiro Isami, Mishima (JP); Kenji Mizutani, Toyota (JP); Hirotaka Ikegami, Toyota (JP); Akihito Yasue, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 112 days.

This patent is subject to a terminal disclaimer.

(21) Appl. No.: 18/813,022

(22) Filed: Aug. 23, 2024

(65) Prior Publication Data

US 2024/0408973 A1 Dec. 12, 2024

Related U.S. Application Data

(63) Continuation of application No. 18/646,671, filed on Apr. 25, 2024, now Pat. No. 12,365,251.

(30) Foreign Application Priority Data

Apr. 26, 2023 (JP) ................................ 2023-072572

(51) Int. Cl.
*B60L 15/20* (2006.01)
*B60K 23/00* (2006.01)

(52) U.S. Cl.
CPC ............. *B60L 15/20* (2013.01); *B60K 23/00* (2013.01); *B60L 2260/26* (2013.01)

(58) Field of Classification Search
CPC .. B60L 15/20; B60L 2260/26; B60L 2240/14; B60L 2240/421; B60L 2240/423;
(Continued)

(56) References Cited

U.S. PATENT DOCUMENTS 9,663,099 B2 * 5/2017 Limbacher ............ B60W 20/13
2011/0130928 A1 6/2011 Matsunaga et al.
(Continued)

FOREIGN PATENT DOCUMENTS

EP 4129746 A1 2/2023
JP 2008-037312 A 2/2008
(Continued)

OTHER PUBLICATIONS

Horsepower House, How to enable paddle-shift paddle shifter on your Dodge Durango R/T RT SE GT SRT Hellcat others, Nov. 16, 2022; https://www.youtube.com/watch?v=9820XloSRqo&t=67s.*
(Continued)

*Primary Examiner* — Behrang Badii
(74) *Attorney, Agent, or Firm* — HAUPTMAN HAM, LLP

(57) ABSTRACT

The electric vehicle of the present disclosure includes an accelerator pedal, a paddle type shifter, and a motor controller. The paddle type shifter is pre-registered with upshift operation, downshift operation, and mode switching operation. The motor controller switches a control mode of the electric motor between a manual mode and an automatic mode in response to the mode switching operation on the paddle type shifter. When the control mode is the automatic mode, the motor controller changes an output of the electric motor in accordance with the operation of the accelerator pedal. On the other hand, when the control mode is the manual mode, the motor controller changes an output characteristic of the electric motor with respect to the operation of the accelerator pedal in accordance with the upshift operation and the downshift operation of the paddle type shifter.

3 Claims, 3 Drawing Sheets

(58) Field of Classification Search
CPC ......... B60L 2240/461; B60L 2240/507; B60L 2250/00; B60L 2250/24; B60L 50/60; B60L 15/2054; B60K 23/00; B60K 2026/025; B60K 26/021; Y02T 10/72; B60W 30/182
See application file for complete search history.

(56) References Cited

U.S. PATENT DOCUMENTS

| | | | | |
|---|---|---|---|---|
| 2012/0078477 | A1 | 3/2012 | Takashiro | |
| 2014/0129067 | A1 | 5/2014 | Furukawa et al. | |
| 2015/0375733 | A1* | 12/2015 | Limbacher | B60W 20/10 180/65.265 |
| 2018/0065618 | A1* | 3/2018 | Nishimine | B60W 10/10 |
| 2018/0281619 | A1 | 10/2018 | Suzuki et al. | |
| 2018/0354490 | A1* | 12/2018 | Moriya | B60W 10/06 |
| 2019/0128408 | A1 | 5/2019 | Kishi et al. | |
| 2021/0404552 | A1 | 12/2021 | Oyama et al. | |
| 2022/0041064 | A1 | 2/2022 | Nishimine et al. | |
| 2023/0001928 | A1* | 1/2023 | Park | B60W 10/188 |
| 2023/0039347 | A1* | 2/2023 | Isami | B60L 3/0046 |
| 2023/0249703 | A1* | 8/2023 | Oh | B60W 10/08 701/22 |
| 2023/0264695 | A1* | 8/2023 | Terai | B60W 30/19 701/54 |

FOREIGN PATENT DOCUMENTS

| | | | |
|---|---|---|---|
| JP | 2011-002055 | A | 1/2011 |
| JP | 2018-166386 | A | 10/2018 |
| JP | 2018-191366 | A | 11/2018 |
| JP | 2019-086038 | A | 6/2019 |
| JP | 2019-131060 | A | 8/2019 |
| JP | 2022-030872 | A | 2/2022 |
| JP | 2022-036845 | A | 3/2022 |
| JP | 2022-072666 | A | 5/2022 |

OTHER PUBLICATIONS

2017 Dodge Durango Owner's Manual, 2016, Dodge, FCA US LLC, pp. 398-399.*

Notice of Allowance in U.S. Appl. No. 18/646,671, mailed Apr. 2, 2025, 21pp.

* cited by examiner

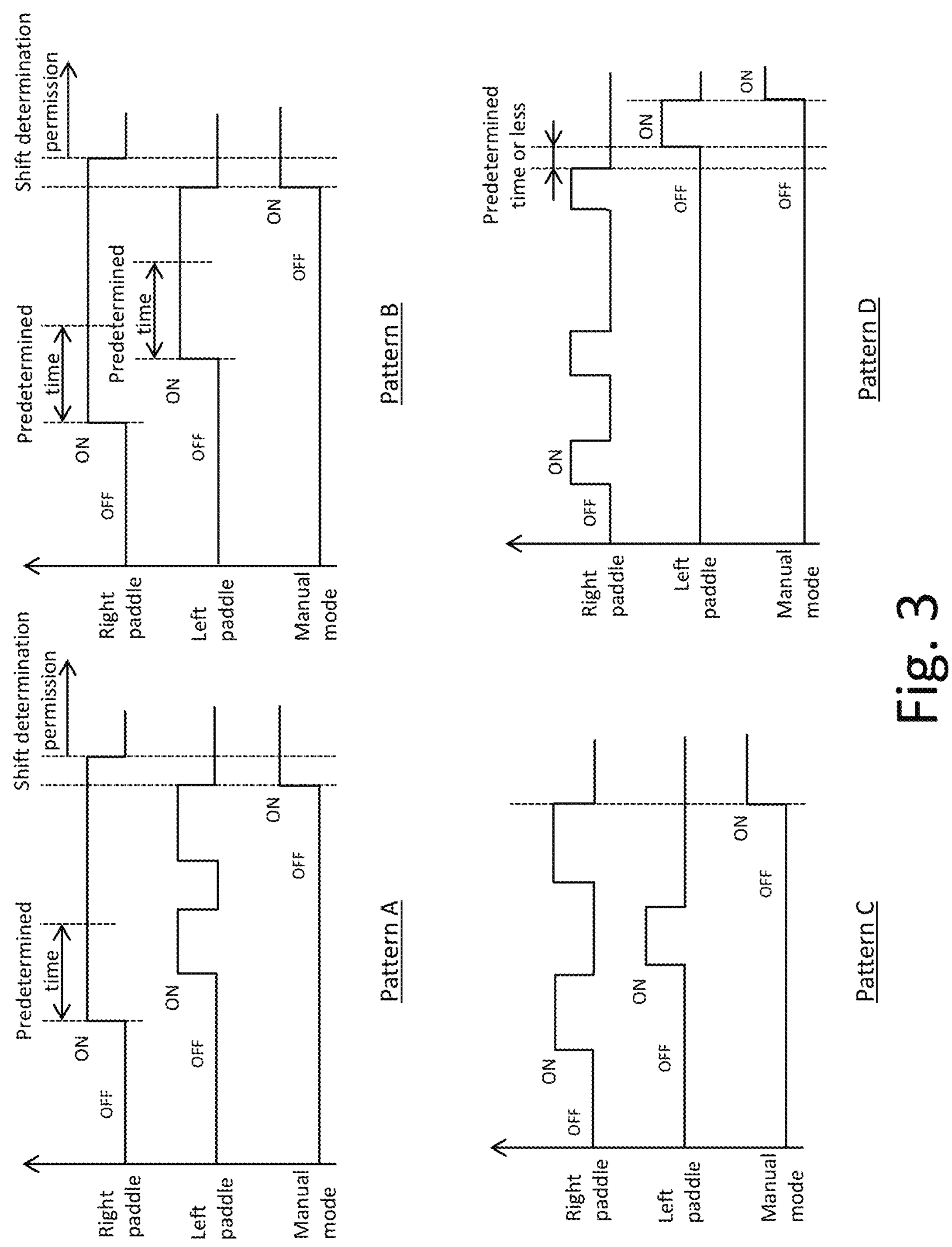
Shift determination permission
Predetermined time
Right paddle
Left paddle
Manual mode
OFF
ON
Pattern A
Shift determination permission
Predetermined time
Predetermined time
Right paddle
Left paddle
Manual mode
OFF
ON
Pattern B
Right paddle
Left paddle
Manual mode
OFF
ON
Pattern C
Predetermined time or less
Right paddle
Left paddle
Manual mode
OFF
ON
Pattern D
Fig. 3

ELECTRIC VEHICLE

CROSS-REFERENCE TO RELATED APPLICATIONS

The present application is a continuation of U.S. patent application Ser. No. 18/646,671, filed Apr. 25, 2024, which claims priority under 35 U.S.C. § 119 to Japanese Patent Application No. 2023-072572, filed Apr. 26, 2023, the contents of each of which are incorporated herein by reference in their entirety.

BACKGROUND

Field

The present disclosure relates to an electric vehicle having an electric motor for traveling.

Background Art

JP2022-036845A discloses an electric vehicle capable of simulating a manual gear shift operation of a manual transmission vehicle (hereinafter referred to as an MT vehicle) by controlling an electric motor.

SUMMARY

Here, a normal control mode of the electric motor in the electric vehicle is referred to as an automatic mode, and a control mode of the electric motor for simulating a manual gear shift operation of the MT vehicle is referred to as a manual mode. A switch may be used for switching the control mode between the automatic mode and the manual mode. However, the switch has to be installed in a position that forces the driver to take his/her hand off a steering wheel, which is not convenient for the driver.

The present disclosure has been made in view of the above problems. An object of the present disclosure is to provide an electric vehicle that enables a driver to enjoy driving like an MT vehicle by switching a control mode without taking his/her hand off a steering wheel.

An electric vehicle of the present disclosure includes an accelerator pedal, a paddle type shifter, and a motor controller. The paddle type shifter is pre-registered with upshift operation, downshift operation, and mode switching operation. The motor controller switches a control mode of the electric motor between a manual mode and an automatic mode in response to the mode switching operation on the paddle type shifter. When the control mode is the automatic mode, the motor controller changes an output of the electric motor in accordance with the operation of the accelerator pedal. On the other hand, when the control mode is the manual mode, the motor controller changes an output characteristic of the electric motor with respect to the operation of the accelerator pedal in accordance with the upshift operation and the downshift operation of the paddle type shifter.

According to the electric vehicle of the present disclosure, the driver can switch the control mode between the manual mode and the automatic mode by operating the paddle type shifter without taking his/her hand off the steering wheel. In the manual mode, the driver can enjoy driving by manual shifting as in the MT vehicle by operating the paddle type shifter.

BRIEF DESCRIPTION OF THE DRAWINGS

FIG. 3 is a timing chart illustrating examples of mode switching operation by a paddle type shifter.

DETAILED DESCRIPTION

Figure 1:
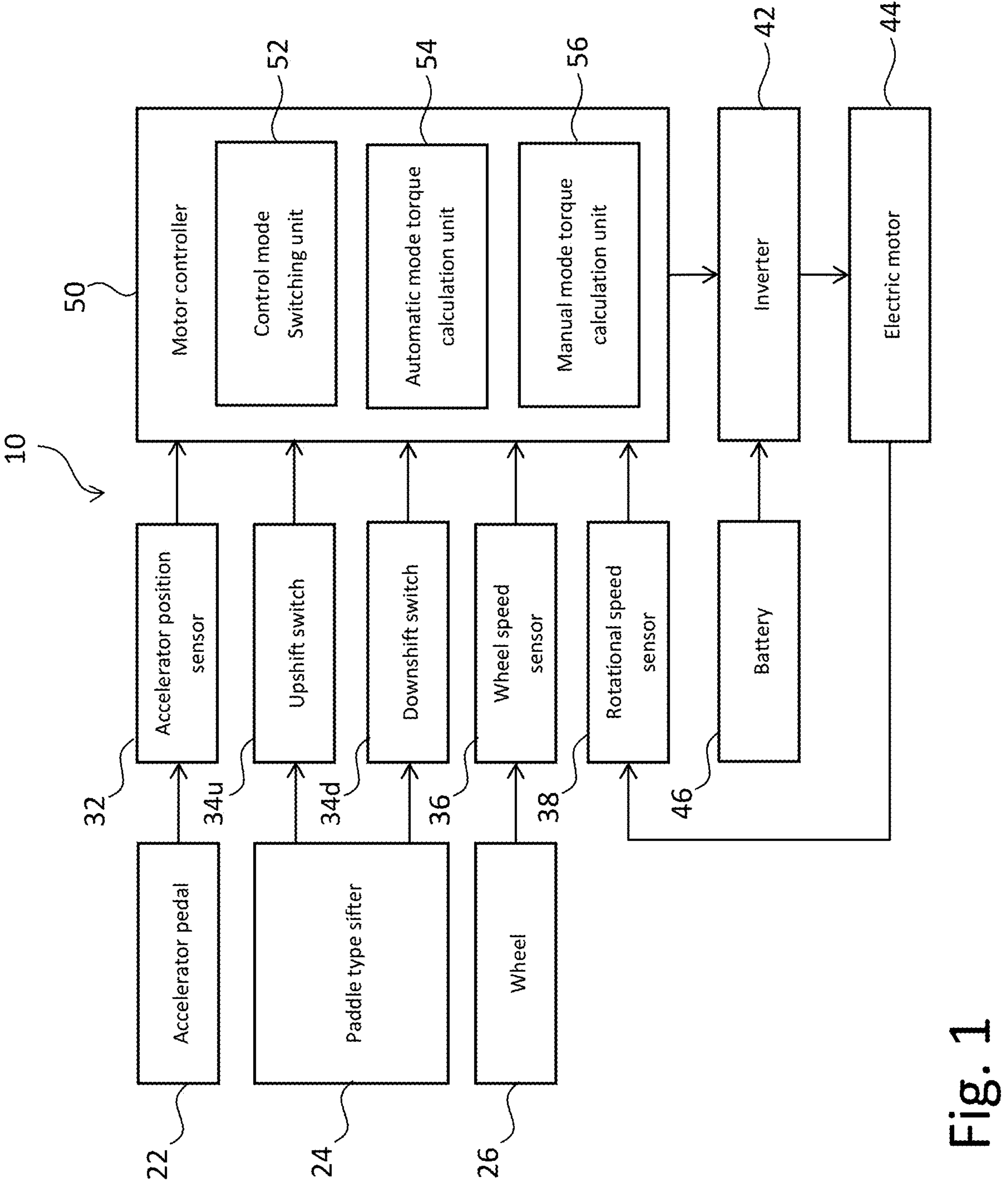
FIG. 1 is a block diagram illustrating a configuration of a power control system of an electric vehicle according to an embodiment of the present disclosure.

FIG. 1 is a block diagram illustrating a configuration of a power control system of an electric vehicle 10 according to the present embodiment. The electric vehicle 10 includes an electric motor 44, a battery 46, and an inverter 42. The electric motor 44 is a power source for traveling. The battery 46 stores electric energy for driving the electric motor 44. That is, the electric vehicle 10 is a battery electric vehicle (BEV) that travels with electric energy stored in the battery 46. The inverter 42 converts DC power input from the battery 46 during acceleration into driving power for the electric motor 44. The inverter 42 converts regenerative electric power input from the electric motor 44 during deceleration into DC power, and charges the battery 46 with the DC power.

The electric vehicle 10 includes an accelerator pedal 22 for a driver to input an acceleration request to the electric vehicle 10. The accelerator pedal 22 is provided with an accelerator position sensor 32 for detecting an accelerator opening.

The electric vehicle 10 is provided with a paddle type shifter 24. However, the paddle type shifter 24 is a dummy different from an original paddle type shifter. The paddle type shifter 24 has a structure similar to a paddle type shifter provided in a clutch pedal-less MT vehicle. The paddle type shifter 24 is attached to the steering wheel. The paddle-type shifters 24 include an upshift switch 34*u* and a downshift switch 34*d* that determine an operation position. The upshift switch 34*u* generates an upshift signal when pulled forward, and the downshift switch 34*d* generates a downshift signal when pulled forward.

A wheel speed sensor 36 is provided on a wheel 26 of the electric vehicle 10. The wheel speed sensor 36 is used as a vehicle speed sensor for detecting the vehicle speed of the electric vehicle 10. The electric motor 44 is provided with a rotational speed sensor 38 for detecting the rotational speed of the electric motor 44.

The electric vehicle 10 includes a motor controller 50. The motor controller 50 is a device that controls the electric motor 44 by PWM control of the inverter 42. The motor controller 50 receives signals from the accelerator position sensor 32, the upshift switch 34*u*, the downshift switch 34*d*, the wheel speed sensor 36, and the rotation speed sensor 38. The motor controller 50 processes these signals and calculates a motor torque command value for PWM—controlling the inverter 42.

The motor controller 50 is an ECU mounted on the electric vehicle 10. The motor controller 50 may be a combination of a plurality of ECUs. The motor controller 50 includes a control mode switching unit 52, an automatic mode torque calculation unit 54, and a manual mode torque calculation unit 56. Each of the units 52, 54, and 56 may be an independent ECU or may be a function of an ECU obtained by a processor executing a program recorded in a memory.

The control mode switching unit 52 has a function of switching the control mode of the electric motor between an automatic mode and a manual mode. The automatic mode is a normal control mode for driving the electric vehicle 10 as a general electric vehicle. The automatic mode is programmed to continuously change the output of the electric motor 44 in response to the operation of the accelerator pedal 22. The manual mode is a control mode for driving the electric vehicle 10 like an MT vehicle. The manual mode is programmed to vary the output characteristics of the electric motor 44 in response to operation of the accelerator pedal 22 in response to upshifting and downshifting of the paddle type shifter 24. The automatic mode is programmed to accept upshift operation and downshift operation as the operation for switching the strength of the regenerative brake.

The control mode switching unit 52 switches the control mode based on the input pattern of the upshift signal input from the upshift switch 34*u* and the downshift signal input from the downshift switch 34*d*. Specifically, the operation that can be performed by the paddle type shifter 24 includes upshift operation, downshift operation, and mode switching operation. The upshift operation is operation of turning on only the upshift switch 34*u*, and the downshift operation is an operation of turning on only the downshift switch 34*d*. The mode switching operation is an operation of turning on both the upshift switch 34*u* and the downshift switch 34*d* in a predetermined pattern. Examples of the mode switching operation by the paddle type shifter 24 will be described later.

The automatic mode torque calculation unit 54 has a function of calculating the motor torque when the electric motor 44 is controlled in the automatic mode. The automatic mode torque calculation unit 54 stores a motor torque command map. The motor torque command map is a map for determining the motor torque from the accelerator opening and the rotational speed of the electric motor 44. The signal of the accelerator position sensor 32 and the signal of the rotation speed sensor 38 are input to each parameter of the motor torque command map. The motor torque corresponding to these signals is output from the motor torque command map. Therefore, in the automatic mode, even if the driver operates the paddle type shifter 24, the operation by the driver is not reflected in the motor torque.

The manual mode torque calculation unit 56 comprises a vehicle model. The vehicle model is a model for calculating a driving wheel torque that should be obtained by the operation of the accelerator pedal 22 and the paddle type shifter 24 when the electric vehicle 10 is assumed to be an MT vehicle. The manual mode torque calculation unit 56 converts the driving wheel torque calculated by the vehicle model into a motor torque using a reduction ratio from the output shaft of the electric motor 44 to the driving wheels.

Figure 2:
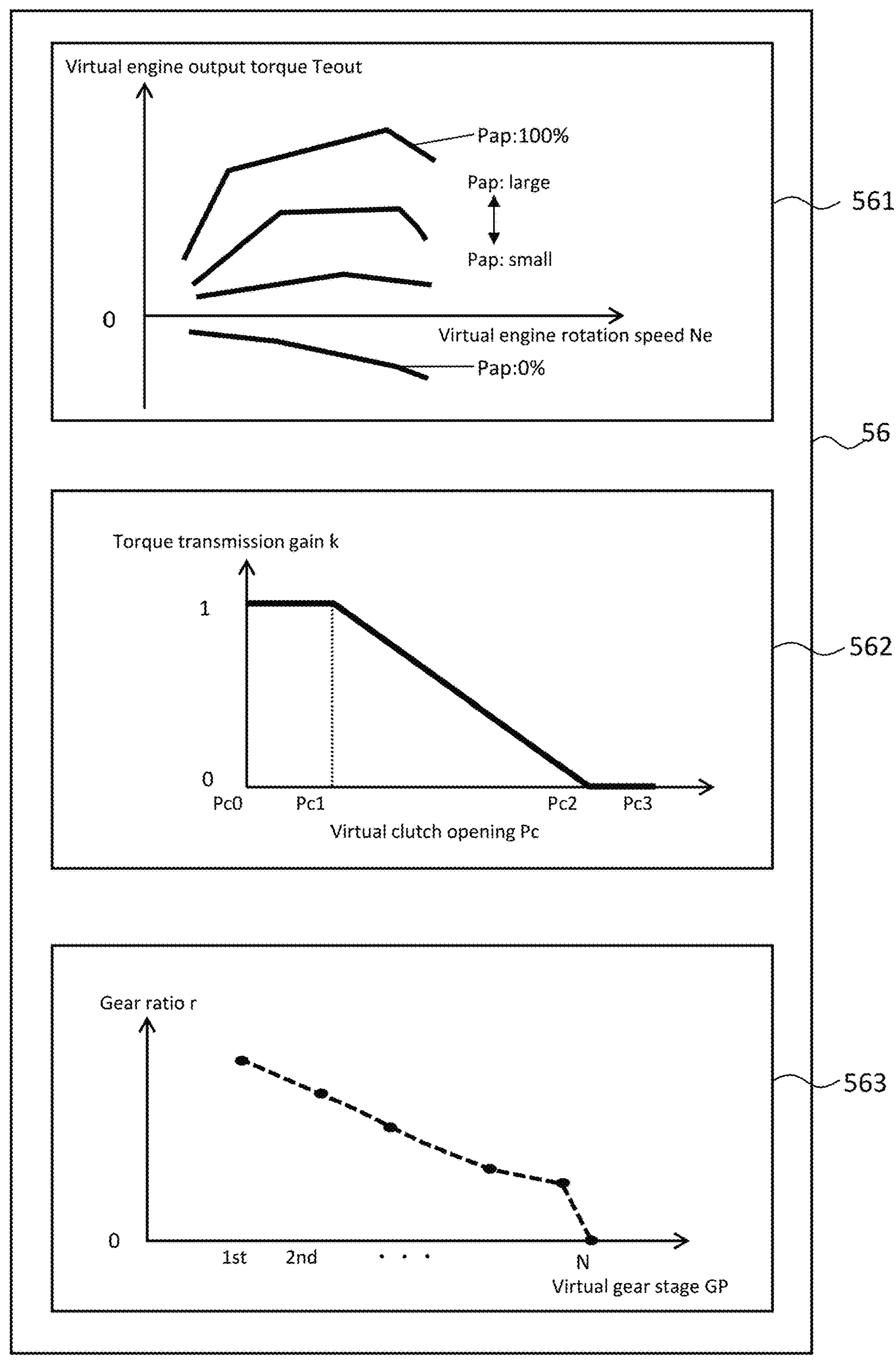
FIG. 2 is a diagram illustrating an example of a vehicle model including an engine model, a clutch model, and a transmission model.

The vehicle model included in the manual mode torque calculation unit 56 will be described with reference to FIG. 2. As illustrated in FIG. 2, the vehicle model includes an engine model 561, a clutch model 562, and a transmission model 563. The engine, the clutch, and the transmission virtually realized by the vehicle model are referred to as a virtual engine, a virtual clutch, and a virtual transmission, respectively. The virtual engine is modeled in the engine model 561. The virtual clutch is modeled in the clutch model 562. The virtual transmission is modeled in the transmission model 563.

The engine model 561 calculates a virtual engine rotation speed and a virtual engine output torque. The virtual engine rotation speed is calculated from a wheel speed, a total reduction ratio, and a slip ratio of the virtual clutch. The virtual engine output torque is calculated from the virtual engine rotation speed and an accelerator opening. For the calculation of the virtual engine output torque, a map that defines the relationship between the accelerator opening Pap, the virtual engine rotation speed Ne, and the virtual engine output torque Teout is used, as illustrated in FIG. 2. In this map, the virtual engine output torque Teout corresponding to the virtual engine rotation speed Ne is given for each accelerator opening Pap. The torque characteristic illustrated in FIG. 2 can be set to a characteristic assuming a gasoline engine or a characteristic assuming a diesel engine. Further, the torque characteristic may be set to a characteristic assuming a naturally aspirated engine, or may be set to a characteristic assuming a supercharged engine.

The clutch model 562 calculates a torque transmission gain. The torque transmission gain is a gain for calculating the degree of torque transmission of the virtual clutch according to the virtual clutch opening. The virtual clutch opening is normally 0%, and is temporarily opened to 100% in conjunction with the switching of the virtual gear stage of the virtual transmission. The clutch model 562 has a map as illustrated in FIG. 2. In this map, a torque transmission gain k is given to the virtual clutch opening Pc. In FIG. 2, Pc0 corresponds to a position where the virtual clutch opening Pc is 0%, and Pc3 corresponds to a position where the virtual clutch opening Pc is 100%. The range from Pc0 to Pc1 and the range from Pc2 to Pc3 are dead zones in which the torque transmission gain k does not change depending on the virtual clutch opening Pc. The clutch model 562 calculates a clutch output torque using the torque transfer gain. The clutch output torque is torque output from the virtual clutch. The clutch model 562 calculates a slip ratio. The slip ratio is used for calculation of the virtual engine rotation speed in the engine model 561. For the calculation of the slip ratio, a map in which the slip ratio is given with respect to the virtual clutch opening can be used, similarly to the torque transmission gain.

The transmission model 563 calculates a gear ratio or a speed change ratio. The gear ratio is a gear ratio determined by the virtual gear stage of the virtual transmission. The virtual gear stage is shifted up by one stage in response to the upshift operation of the paddle type shifter 24, and the virtual gear stage is shifted down by one stage in response to the downshift operation of the paddle type shifter 24. The transmission model 563 has a map as illustrated in FIG. 2. In this map, the gear ratio r is given to the virtual gear stage GP so that the gear ratio r decreases as the virtual gear stage GP increases. The transmission model 563 calculates a transmission output torque using the gear ratio and the clutch output torque obtained from the map. The transmission output torque changes discontinuously in response to the switching of the gear ratio. This discontinuous change in the transmission output torque causes a shift shock, causing the driver to feel as if driving a vehicle having a stepped transmission.

The vehicle model calculates a driving wheel torque using a predetermined reduction ratio. The reduction ratio is a fixed value determined by a mechanical structure from the virtual transmission to the driving wheels. A value obtained by multiplying the reduction ratio by the gear ratio is the above-described total reduction ratio. The vehicle model calculates the driving wheel torque from the transmission output torque and the reduction ratio. The motor torque in the manual mode is calculated by multiplying the driving wheel torque by the reduction ratio from the output shaft of the electric motor 44 to the driving wheels.

Finally, an example of the mode switching operation by the paddle type shifter 24 will be described with reference to FIG. 3. As described above, the mode switching operation is performed by turning on both the upshift switch 34*u* and the downshift switch 34*d* in a predetermined pattern. Here, it is assumed that the upshift switch 34*u* is attached to the right paddle of the paddle type shifter 24, and the downshift switch 34*d* is attached to the left paddle of the paddle type shifter 24. FIG. 3 illustrates operation patterns of the right paddle and the left paddle for turning on the manual mode. The operation patterns illustrated in FIG. 3 are four patterns A, B, C, and D.

In the pattern A, the manual mode is turned on by double-clicking the left paddle while pressing the right paddle for a predetermined time or longer. Then, by releasing the right paddle after double-clicking the left paddle, upshift operation by clicking the right paddle and downshift operation by clicking the left paddle can be performed. The number of clicks of the left paddle for turning on the manual mode may be set to three or more. In the pattern A, the operation of the right paddle and the operation of the left paddle mat be reversed so that the manual mode is turned on by clicking the right paddle a plurality of times while pressing the left paddle for a predetermined time or longer. The operation of the pattern A can also be used as operation of turning off the manual mode, that is, operation of turning on the automatic mode.

In the pattern B, the manual mode is turned on by pressing the left paddle for a predetermined time or more in a state where the right paddle is pressed for a predetermined time or more. Then, by releasing the right paddle after releasing the left paddle, upshift operation by clicking the right paddle and downshift operation by clicking the left paddle can be performed. In the pattern B, the operation of the right paddle and the operation of the left paddle may be reversed so that the manual mode is turned on by pressing the right paddle for a predetermined time or more in a state where the left paddle is pressed for a predetermined time or more. The operation of the pattern B can also be used as operation of turning off the manual mode, that is, operation of turning on the automatic mode.

In the pattern C, the manual mode is turned on by alternately clicking the right paddle and the left paddle. In the example illustrated in FIG. 3, the right paddle is clicked twice and the left paddle is clicked once, but the number of clicks may be further increased. In the pattern C, the operation of the right paddle and the operation of the left paddle may be reversed so that the operation is started from the click of the left paddle. In the pattern C, the manual mode may be turned on by alternately pressing the right paddle and the left paddle for a predetermined time or more.

In the pattern D, the manual mode is turned on by clicking the right paddle a plurality of times and clicking the left paddle within a predetermined time after the last click of the right paddle. When the predetermined time elapses after the last click of the right paddle, the operation of the right paddle is reset. In the pattern D, the operation of the right paddle and the operation of the left paddle may be reversed so that the manual mode is turned on by clicking the left paddle a plurality of times and clicking the right paddle within a predetermined time after the last click of the left paddle.

What is claimed is:

1. A device comprising:

a motor controller configured to:

switch a control mode of an electric motor of a vehicle between an automatic mode and a manual mode in response to a mode switching operation to a paddle type shifter of the vehicle, in the automatic mode, change an output of the electric motor in accordance with operation of an accelerator pedal of the vehicle, and in the manual mode, change an output characteristic of the electric motor with respect to the operation of the accelerator pedal in accordance with an upshift operation and a downshift operation to the paddle type shifter, wherein the output characteristic includes a driving wheel torque of the electric motor, wherein the motor controller is configured to, in the manual mode, change the driving wheel torque of the electric motor in accordance with a vehicle model for determining the driving wheel torque based on the operation of the accelerator pedal and the at least one of the upshift operation and the downshift operation to the paddle type shifter, wherein the vehicle model includes at least an engine model, a clutch model, and a transmission model, wherein the at least one of the upshift operation and the downshift operation to the paddle type shifter selects a virtual gear, and wherein the virtual gear selected by the paddle type shifter is among a plurality of virtual gears, wherein each virtual gear represents a gear ratio.

2. A method comprising:

changing, in an automatic mode, an output of an electric motor of a vehicle in accordance with operation of an accelerator pedal of the vehicle;

switching a control mode of from the automatic mode to a manual mode in response to a mode switching operation to a paddle type shifter of the vehicle; and changing, in the manual mode, an output characteristic of the electric motor with respect to the operation of the accelerator pedal in accordance with an upshift operation and a downshift operation to the paddle type shifter, wherein the output characteristic includes a driving wheel torque of the electric motor, wherein the method further comprises changing, in the manual mode, the driving wheel torque of the electric motor in accordance with a vehicle model for determining the driving wheel torque based on the operation of the accelerator pedal and the at least one of the upshift operation and the downshift operation to the paddle type shifter, wherein the vehicle model includes at least an engine model, a clutch model, and a transmission model, wherein the at least one of the upshift operation and the downshift operation to the paddle type shifter selects a virtual gear, and wherein the virtual gear selected by the paddle type shifter is among a plurality of virtual gears, wherein each virtual gear represents a gear ratio.

3. A computer-readable memory including a program recorded thereon that, when executed by a processor, causes the processer to perform operations comprising:

changing, in an automatic mode, an output of an electric motor of a vehicle in accordance with operation of the accelerator pedal of the vehicle;

switching a control mode from the automatic mode to a manual mode in response to one or more signals from a paddle type shifter of the vehicle; and changing, in the manual mode, an output characteristic of the electric motor with respect to the operation of the accelerator pedal in accordance with an upshift operation and a downshift operation to the paddle type shifter, wherein the output characteristic includes a driving wheel torque of the electric motor, wherein the operations further comprise changing, in the manual mode, the driving wheel torque of the electric motor in accordance with a vehicle model for determining the driving wheel torque based on the operation of the accelerator pedal and the at least one of the upshift operation and the downshift operation to the paddle type shifter, wherein the vehicle model includes at least an engine model, a clutch model, and a transmission model, wherein the at least one of the upshift operation and the downshift operation to the paddle type shifter selects a virtual gear, and wherein the virtual gear selected by the paddle type shifter is among a plurality of virtual gears, wherein each virtual gear represents a gear ratio.

* * * * *